UNITED STATES PATENT OFFICE.

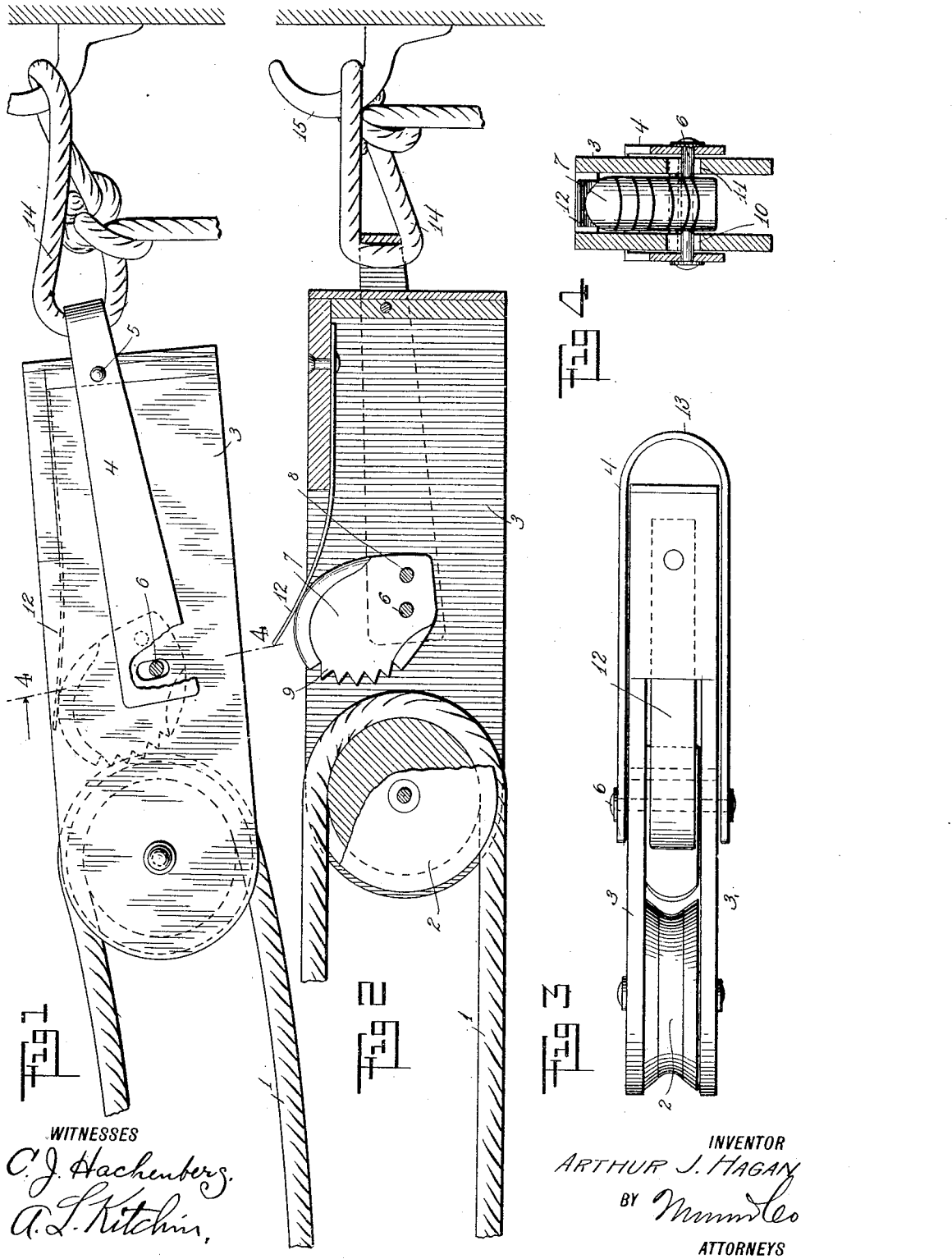

ARTHUR J. HAGAN, OF NEW YORK, N. Y.

PULLEY AND LOCK FOR CABLES.

1,107,934. Specification of Letters Patent. Patented Aug. 18, 1914.

Application filed July 24, 1913. Serial No. 780,920.

*To all whom it may concern:*

Be it known that I, ARTHUR J. HAGAN, a citizen of the United States, and a resident of the city of New York, borough of Manhattan, in the county and State of New York, have invented a new and Improved Pulley and Lock for Cables, of which the following is a full, clear, and exact description.

This invention relates to improvements in pulleys and locks for ropes, cables and the like, and particularly to a pulley and lock for clothes lines.

The object in view is to provide an improved structure in which the clothes line will be properly held in position and locked against movement when the line is slack, but will be permitted a free movement over the pulley when the line is taut.

Another object of the invention is to provide a pulley and lock formed with a pivotally mounted locking device designed to grip a cable passed over the pulley when the cable engaging the pulley has become slack, the locking means being actuated by the weight of the pulley and housing, together with the cable, whereby when the rope becomes slack for any reason, as for instance by breakage, the lock will automatically be actuated so that the unbroken section or half of the cable will not fall.

In carrying out the object of the invention a housing of any desired kind is provided for a pulley on which is pivotally mounted a link structure designed to be connected with a supporting hook or any suitable means, as for instance a short piece of cable or rope. This link structure is adapted to cause the actuation of a pivotally mounted lock or pawl structure when the housing moves downwardly as when the cable is slack. This is very desirable in clothes lines as the cable will be locked rigidly to the pawl in case one length of the cable is broken.

In the accompanying drawings Figure 1 is a side view of the embodiment of the invention; Fig. 2 is a longitudinal vertical section through the structure shown in Fig. 1; Fig. 3 is a top plan view of the structure shown in Fig. 1; Fig. 4 is a section through Fig. 1 on line 4—4.

Referring to the accompanying drawings by numeral 1 indicates a clothes line or cable of any desired kind designed to be passed over the pulley 2 and also over an opposite pulley on a pole or other support, whereby the cable may be freely moved in the usual manner of a clothes line. The pulley 2 is pivotally mounted in a housing 3. This housing has pivotally connected therewith a substantially U-shaped link 4, the same being connected to housing 3 by a pivotal pin 5 arranged at the rear of the housing. Link 5 carries at its forward end a pin 6 passing through the locking pawl 7 which is pivoted at 8 to the housing. Locking pawl 7 is provided with a plurality of teeth 9 designed to engage cable 1 when the cable becomes slack as shown in Fig. 1. The housing 3 is provided with slots 10 and 11 for accommodating the movement of pin 6 so as to allow pawl 7 to be moved freely from the position shown in Fig. 1 to the position shown in Fig. 2. A spring 12 is connected with housing 3 and continually acts on pawl 7 for giving the same a tendency to engage the cable 1, or if desired this spring could be eliminated and the pawl made sufficiently heavy to act in this manner under the action of gravity. The rear end 13 of link 4 is designed to accommodate a short piece of rope or cable 14 which is passed over a suitable hook or other support 15 and drawn tight as shown in Fig. 2 when it is desired to use the clothes line. When the rope 14 is drawn tight cable 1 is brought under tension, and at the same time the line of strain is such as to cause link 4 to move pivotally upwardly and thereby raise pawl 7 to the position shown in Fig. 2. As long as a sufficient strain is on the link 4 pawl 7 remains in this position, but as soon as cable 1 becomes slack for any reason, as shown in Fig. 1, the pawl 7 will move downwardly and engage the cable so that the cable cannot move over pulley 2. This is very desirable as when the clothes have been put out the rope can be slackened and then left with the assurance that the same are locked against unauthorized removal, and also against being lowered to the ground by a breaking of part of the clothes line.

It will of course be evident that the device could be secured to a suitable hook on a window or could be secured to any support inside of the housing without departing from the spirit of the invention. It will also be observed that the clothes may be recovered from the window as part of the cable is locked rigidly to the pawl.

Having thus described my invention what

I claim as new and desire to secure by Letters Patent is—

1. In a device of the character described, a housing, a pulley mounted in said housing near one end thereof, a link pivotally connected to the opposite end of said housing, said link extending from its pivotal connection to a point near said pulley, a pivotally mounted pawl adapted to engage a cable mounted on said pulley, spring means for pressing said pawl toward said pulley, and means extending from the end of said link which is arranged near said pulley for engaging said pawl, and thereby raising the same when said link is moved in one direction.

2. In a device of the character described, a housing, a pulley mounted in said housing designed to receive a cable, a pawl structure pivotally mounted on said housing and designed to move pivotally against said cable, a pivotally mounted supporting link arranged on said housing and means connected with said supporting link engaging said pawl for moving said pawl out of engagement with said cable when the cable is brought under tension.

3. In a device of the character described, a housing, a pulley mounted in said housing designed to receive a cable, a pivotally mounted pawl arranged on said housing adapted to engage said cable and lock the same against said pulley, said housing being formed with a slot adjacent said pawl, a pivotally mounted link connected with said housing for supporting the same, and a pin extending from said link through said slot and engaging said pawl for moving the same into and out of engagement with said cable.

4. In a device of the character described, a housing formed with a pair of slots therein, a pulley pivotally mounted in said housing designed to receive a cable, a pawl pivotally mounted adjacent said slot and arranged to engage and lock said cable against said pulley, means acting on said pawl for causing the same to engage said cable, a link pivotally mounted on one end of said housing, said link overlapping the slots in said housing, a pin passing through said link, said slots and said pawl, and means acting on said link for causing the same to support said housing and to move said pawl out of engagement with said cable.

In testimony whereof I have signed my name to this specification in the presence of two subscribing witnesses.

ARTHUR J. HAGAN.

Witnesses:
 JOSEPH WETTERER,
 JOHN F. DALEY.

---

Copies of this patent may be obtained for five cents each, by addressing the "Commissioner of Patents, Washington, D. C."